(12) United States Patent
Lindteigen

(10) Patent No.: US 7,715,563 B2
(45) Date of Patent: May 11, 2010

(54) RAPID ACQUISITION OF STATE VECTORS IN AN ENCRYPTED DATA COMMUNICATION SYSTEM

(75) Inventor: Ty Lindteigen, Chandler, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 1121 days.

(21) Appl. No.: 11/357,785

(22) Filed: Feb. 16, 2006

(65) Prior Publication Data

US 2007/0189538 A1    Aug. 16, 2007

(51) Int. Cl.
*H04L 9/32* (2006.01)
*H04K 1/00* (2006.01)
*H04L 9/00* (2006.01)
*H04L 9/30* (2006.01)

(52) U.S. Cl. .................... 380/274; 380/45; 380/30; 380/42

(58) Field of Classification Search .................. 380/30, 380/42, 45, 274, 255
See application file for complete search history.

(56) References Cited

U.S. PATENT DOCUMENTS

| | | | | |
|---|---|---|---|---|
| 5,809,147 A * | 9/1998 | De Lange et al. | ............ | 380/28 |
| 6,389,138 B1 * | 5/2002 | Li et al. | ............ | 380/35 |
| 7,003,114 B1 * | 2/2006 | Mauro | ............ | 380/261 |
| 7,035,309 B2 * | 4/2006 | Sudo et al. | ............ | 375/130 |
| 7,082,419 B1 * | 7/2006 | Lightowler | ............ | 706/15 |
| 2002/0054622 A1 * | 5/2002 | Sudo et al. | ............ | 375/147 |
| 2006/0045136 A1 * | 3/2006 | Rainbolt et al. | ............ | 370/509 |
| 2007/0022063 A1 * | 1/2007 | Lightowler | ............ | 706/15 |
| 2007/0242828 A1 * | 10/2007 | Lindteigen | ............ | 380/255 |

\* cited by examiner

*Primary Examiner*—Michael J Simitoski
*Assistant Examiner*—Jahangir Kabir
(74) *Attorney, Agent, or Firm*—Ingrassia Fisher & Lorenz, P.C.

(57) ABSTRACT

A state vector acquisition technique for a counter-based cryptographic data communication system is disclosed. The acquisition technique facilitates receipt of the state vector components (the short component and the long components) in any chronological order. The state vector components are saved upon receipt, and a counter for each long component is initialized upon receipt of the long component. After receipt of all components, the receiver device constructs a current state vector value based upon the received component values and the long component counter values.

16 Claims, 8 Drawing Sheets

| TIME | TRANSMITTER STATE VECTOR | TRANSMISSION | RECEIVER STATE VECTOR |
|---|---|---|---|
| 0 | 1234 | SC=4 | 0000 |
|  | SC=4 |  |  |
|  | $L_1=3$ |  | $L_1\_COUNTER=0$ |
|  | $L_2=2$ |  | $L_2\_COUNTER=0$ |
|  | $L_3=1$ |  | $L_3\_COUNTER=0$ |
| 1 | 1235 | $L_1=3$ (CORRUPTED) | 0004 |
|  | SC=5 |  |  |
|  | $L_1=3$ |  | $L_1\_COUNTER=0$ |
|  | $L_2=2$ |  | $L_2\_COUNTER=0$ |
|  | $L_3=1$ |  | $L_3\_COUNTER=0$ |
| 2 | 1236 | $L_2=2$ | 0005 |
|  | SC=6 |  |  |
|  | $L_1=3$ |  | $L_1\_COUNTER=0$ |
|  | $L_2=2$ |  | $L_2\_COUNTER=0$ |
|  | $L_3=1$ |  | $L_3\_COUNTER=0$ |
| 3 | 1237 | $L_3=1$ | 0206 |
|  | SC=7 |  |  |
|  | $L_1=3$ |  | $L_1\_COUNTER=0$ |
|  | $L_2=2$ |  | $L_2\_COUNTER=1$ |
|  | $L_3=1$ |  | $L_3\_COUNTER=0$ |
| 4 | 1238 | SC=8 | 1207 |
|  | SC=8 |  |  |
|  | $L_1=3$ |  | $L_1\_COUNTER=0$ |
|  | $L_2=2$ |  | $L_2\_COUNTER=2$ |
|  | $L_3=1$ |  | $L_3\_COUNTER=1$ |
| 5 | 1239 | $L_1=3$ | 1208 |
|  | SC=9 |  |  |
|  | $L_1=3$ |  | $L_1\_COUNTER=0$ |
|  | $L_2=2$ |  | $L_2\_COUNTER=3$ |
|  | $L_3=1$ |  | $L_3\_COUNTER=2$ |
| 6 |  |  | 1239 |

*FIG. 8*

| TIME | TRANSMITTER STATE VECTOR | TRANSMISSION | RECEIVER STATE VECTOR |
|---|---|---|---|
| 0 | 8997 | SC = 7 | 0000 |
|  | SC = 7 |  |  |
|  | $L_1 = 9$ |  | $L_1$_COUNTER = 0 |
|  | $L_2 = 9$ |  | $L_2$_COUNTER = 0 |
|  | $L_3 = 8$ |  | $L_3$_COUNTER = 0 |
| 1 | 8998 | $L_1$ = 9 (CORRUPTED) | 0007 |
|  | SC = 8 |  |  |
|  | $L_1 = 9$ |  | $L_1$_COUNTER = 0 |
|  | $L_2 = 9$ |  | $L_2$_COUNTER = 0 |
|  | $L_3 = 8$ |  | $L_3$_COUNTER = 0 |
| 2 | 8999 | $L_2$ = 9 | 0008 |
|  | SC = 9 |  |  |
|  | $L_1 = 9$ |  | $L_1$_COUNTER = 0 |
|  | $L_2 = 9$ |  | $L_2$_COUNTER = 0 |
|  | $L_3 = 8$ |  | $L_3$_COUNTER = 0 |
| 3 | 9000 | $L_3$ = 9 | 0909 |
|  | SC = 0 |  |  |
|  | $L_1 = 0$ |  | $L_1$_COUNTER = 0 |
|  | $L_2 = 0$ |  | $L_2$_COUNTER = 1 |
|  | $L_3 = 9$ |  | $L_3$_COUNTER = 0 |
| 4 | 9001 | SC = 1 | 9900 |
|  | SC = 1 |  |  |
|  | $L_1 = 0$ |  | $L_1$_COUNTER = 0 |
|  | $L_2 = 0$ |  | $L_2$_COUNTER = 2 |
|  | $L_3 = 9$ |  | $L_3$_COUNTER = 1 |
| 5 | 9002 | $L_1$ = 0 | 9901 |
|  | SC = 2 |  |  |
|  | $L_1 = 0$ |  | $L_1$_COUNTER = 0 |
|  | $L_2 = 0$ |  | $L_2$_COUNTER = 3 |
|  | $L_3 = 9$ |  | $L_3$_COUNTER = 2 |
| 6 |  |  | 9902 |

FIG. 9

| TIME | TRANSMITTER STATE VECTOR | TRANSMISSION | RECEIVER STATE VECTOR |
|---|---|---|---|
| 0 | 8997 | SC = 7 | 0000 |
|  | SC = 7 |  |  |
|  | $L_1 = 9$ |  | $L_1$_COUNTER = 0 |
|  | $L_2 = 9$ |  | $L_2$_COUNTER = 0 |
|  | $L_3 = 8$ |  | $L_3$_COUNTER = 0 |
| 1 | 8998 | $L_1 = 9$ | 0007 |
|  | SC = 8 |  |  |
|  | $L_1 = 9$ |  | $L_1$_COUNTER = 0 |
|  | $L_2 = 9$ |  | $L_2$_COUNTER = 0 |
|  | $L_3 = 8$ |  | $L_3$_COUNTER = 0 |
| 2 | 8999 | $L_2 = 9$ (CORRUPTED) | 0098 |
|  | SC = 9 |  |  |
|  | $L_1 = 9$ |  | $L_1$_COUNTER = 1 |
|  | $L_2 = 9$ |  | $L_2$_COUNTER = 0 |
|  | $L_3 = 8$ |  | $L_3$_COUNTER = 0 |
| 3 | 9000 | $L_3 = 9$ | 0099 |
|  | SC = 0 |  |  |
|  | $L_1 = 0$ |  | $L_1$_COUNTER = 2 |
|  | $L_2 = 0$ |  | $L_2$_COUNTER = 0 |
|  | $L_3 = 9$ |  | $L_3$_COUNTER = 0 |
| . . . | . . . | . . . | . . . |
| 14 | 9011 | $L_2 = 0$ | 9090 |
|  | SC = 1 |  |  |
|  | $L_1 = 1$ |  | $L_1$_COUNTER = 13 |
|  | $L_2 = 0$ |  | $L_2$_COUNTER = 0 |
|  | $L_3 = 9$ |  | $L_3$_COUNTER = 11 |
| 15 |  |  | 9091 |

*FIG. 10*

RAPID ACQUISITION OF STATE VECTORS IN AN ENCRYPTED DATA COMMUNICATION SYSTEM

TECHNICAL FIELD

The present invention relates generally to data communication systems. More particularly, the present invention relates to encryption techniques for data communication systems.

BACKGROUND

The prior art is replete with data encryption techniques and data communication systems that employ encrypted data transmission. Applications typically use a counter-based cryptographic mode with a symmetric encryption algorithm when operating in environments having high transmission error rates. The counter, which is usually linear in nature, is known as the state vector. In operation, the state vector increments with each unit of data traffic (e.g., a voice frame, a TDMA payload, or the like). In order to begin decrypting traffic, the receiver device must have knowledge of the encryption/decryption key, along with the current value of the state vector.

FIG. 1 is a schematic representation of a data communication system 100 that encrypts/decrypts data traffic using symmetric algorithms, a key, and a state vector. System 100 includes a transmitting device 102 and a receiving device 104. FIG. 1 assumes that transmitting device 102 and one or more receiving devices 104 have knowledge of a shared key 106 (such knowledge may be the result of an exchange or negotiation process, a key acquisition process, or any known technique). Transmitting device 102 maintains the current value of the state vector 108a, which must be acquired by receiving device 104 before receiving device 104 can decrypt the encrypted traffic (reference number 108b indicates the state vector acquired by receiving device 104). The value of state vector 108 is transmitted to receiving device 104 via cryptographic synchronization messages 110.

The number of bits in state vector 108 is selected to suit the needs of data communication system 100. The size of state vector 108 is related to the amount of traffic counted by state vector 108. For example, a 128-bit state vector will increment at least once for every 128 bits of transmitted clear traffic. System 100 encrypts and decrypts data in a known manner. The encrypt engine 112 of transmitting device 102 processes the current value of state vector 108a and the value of key 106a to generate a key stream 114. The number of bits in key stream 114 is equal to or less than the number of bits in state vector 108a, for example, 128 bits. An XOR operation is performed on the bits in key stream 114 and bits of clear traffic 116a. The encrypted traffic 117 is then transmitted to receiving device 104. Assuming that receiving device 104 has acquired state vector 108b, it can decrypt the incoming traffic to recreate clear traffic 116b.

The decryption process relies upon knowledge of the current value of state vector 108b. When state vector 108b matches state vector 108a, they are in cryptographic synchronization. In this regard, there are two states of cryptographic synchronization: acquisition and maintenance. When receiver device 104 begins to receive traffic, it must acquire state vector 108b for the first time. Once receiver device 104 has acquired state vector 108b, it must update it and/or adjust it for traffic perturbations, which cause state vector 108b to be incorrect. Such updating and adjustment is known as "maintenance." "Late entry" means that receiving device 104 has knowledge of key 106b, but has not yet acquired state vector 108b. In other words, receiving device 104 is still receiving and processing cryptographic synchronization messages from transmitting device 102. For short-burst transmission environments, a transmitter may consume 100% of the bandwidth at the beginning of each transmission to convey the entire state vector before sending the encrypted traffic. For transmissions longer than a few seconds and in poor environments, late entry becomes more common. In this context, late entry results when the initial frames that contained the entire state vector were missed. Moreover, in environments where traffic may be lost during transmission, the decrypt engine 118 may lose synchronization when the number of bits being decrypted does not equal the number of encrypted bits. In this situation, receiving device 104 performs state vector maintenance to resynchronize with transmitting device 102.

Broadcasting the entire state vector at regular intervals consumes too much bandwidth, and this can negatively impact the quality of data transmission (for example, voice communication). Consequently, conventional systems transmit state vectors as a series of subcomponents. FIG. 2 depicts a state vector 200 as a series of long components 202 and a short component 204. Short component 204 represents the least significant (and most rapidly changing) bits of state vector 200. Long components 202 represent the remainder of state vector 200 as a number of segments, which may or may not be the same length as short component 204. By reducing the size of long components 202 and increasing the number of long components 202, it becomes easier to insert them into traffic by consuming less important bits with the application stream, or by consuming unused bits in payloads. The difficulty then lies in acquiring state vector 200 from short component 204 and long components 202 while the components are changing between the broadcast of each component. The problem is exacerbated on impaired channels where some components will be lost or corrupted during transmission, resulting in disordered reception of state vector 200.

Conventional systems employ an ordered state vector acquisition technique that relies upon ordered transmission and receipt of the state vector components. Transmitting device 102 sends each component in a different message. Each long component message contains a segment ID that enables receiving device 104 to determine the relative position of each long component within state vector 200. FIG. 2 depicts a segment ID field 206 for the message corresponding to the long component labeled "L-2." The value of a given long component 202 is the current state of the respective subset of bits in state vector 200 at the time when the corresponding encrypted traffic bits were transmitted. In this regard, FIG. 2 depicts a long component value field 208 for the message corresponding to the long component labeled "L-2." Long component value field 208 contains the string of bits associated with long component L-2.

In accordance with the ordered acquisition method, long components 202 are transmitted in order from the least significant bits to the most significant bits. When capturing state vector 200, the received portion of state vector 200 is continually updated in step with received encrypted traffic, even though the traffic need not be decrypted. Changes in the least significant bits will roll over and update the more significant bits as appropriate. If one of the long components 202 is corrupted or lost during transmission, or if a component is otherwise not received in the correct order, then receiving device 104 will discard any previously received components and restart the process. Thus, acquisition of state vector 200 may take an undesirably long time in noisy environments or, in extreme environments, it may be impossible to fully acquire state vector 200. Moreover, a system using the ordered acquisition method may idle for an extended period of time while attempting to receive a specific long component. If the time period is too long, the receiving device may actually receive the next iteration of that long component, resulting in an incorrect state vector 200.

Accordingly, it is desirable to have a state vector acquisition technique that does not require ordered reception of state vector components. In addition, it is desirable to have a state vector acquisition technique that facilitates rapid cryptographic synchronization during late entry over impaired communication channels, and rapid resynchronization during traffic transmission, with less impact on application bandwidth. Furthermore, other desirable features and characteristics of the present invention will become apparent from the subsequent detailed description and the appended claims, taken in conjunction with the accompanying drawings and the foregoing technical field and background.

BRIEF SUMMARY

A data communication system configured in accordance with an example embodiment of the invention supports unordered acquisition of state vector components. The unordered acquisition technique results in quicker cryptographic synchronization and improved performance in noisy and impaired data communication environments. In a practical embodiment, the unordered acquisition method can also be utilized to provide cryptographic synchronization maintenance at the receiving device.

The above and other aspects of the invention may be carried out in one form by a method for acquiring a state vector for a counter-based cryptographic data communication system. The method involves: receiving, in any chronological order, a short component corresponding to the least significant bits of the state vector, and a number of long components corresponding to more significant bits of the state vector; updating the short component in response to each received unit of data traffic to maintain a current short component value; and, after receiving all of the long components in any chronological order, constructing a current state vector value based upon the current short component value and the long components.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

FIGS. 8-10 are diagrams that illustrate examples of unordered state vector acquisition.

DETAILED DESCRIPTION

Figure 1:
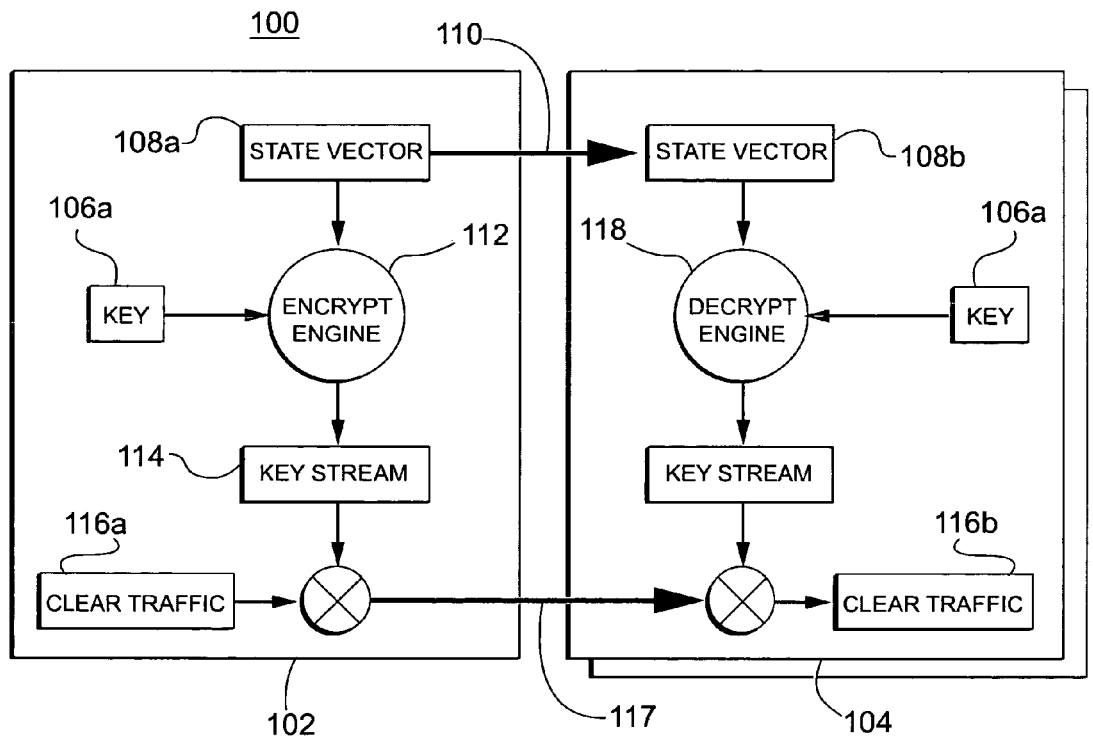
FIG. 1 is a schematic representation of a data communication system.

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to signal processing, data transmission, signaling, encryption/decryption, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description may refer to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically.

The state vector acquisition technique described herein is suitable for use in a data communication system having impaired communication channels, where all of the state vector long components are not likely to be received in chronological order without error. The state vector acquisition technique described herein is an unordered acquisition technique in that the state vector components need not be received in a specified order. The general system architecture and composition of the state vector may be as described above in connection with FIG. 1 and FIG. 2. The receiver device, however, is suitably configured to process received state vector components in the manner described in more detail below.

For the sake of simplicity and brevity, this description contemplates linear state vectors, i.e., state vectors that increment linearly with data traffic. The concept, however, can be equivalently extended for use with nonlinear state vectors.

For purposes of unordered state vector acquisition, each long component has an associated counter that is maintained at the receiver device. Each counter represents the age of its respective long component (i.e., the time of receipt of that long component), preferably in terms of received traffic flow. When a long component is received, its value is retained and its associated counter is set to zero. If a given long component is received more than once, the newer value replaces the older value, and the associated counter is again set to zero. In preferred embodiments, the storage size of each counter is large enough such that the counter will not roll over before the entire state vector has been received. Once received, the short component continues to be updated at the receiver device along with the flow of traffic, however, the roll-over of the short component does not affect any of the long components (in contrast to prior art techniques that require ordered acquisition).

After all of the long components and the short component have been received, in any chronological order, the current state vector value is constructed. In this regard, the current short component value is placed in the least significant position of the state vector, and each long component value is updated as necessary. The updated long component values are placed in order from the least significant position to the most significant position of the state vector. Briefly, the updating of the long components utilizes the long component counters to determine whether the received long components need to be incremented to reflect any rollovers in the long components that would have occurred during acquisition of all state vector components by the receiver device. The long components are updated as needed, then the current state vector value is constructed from the updated components.

Figure 2:
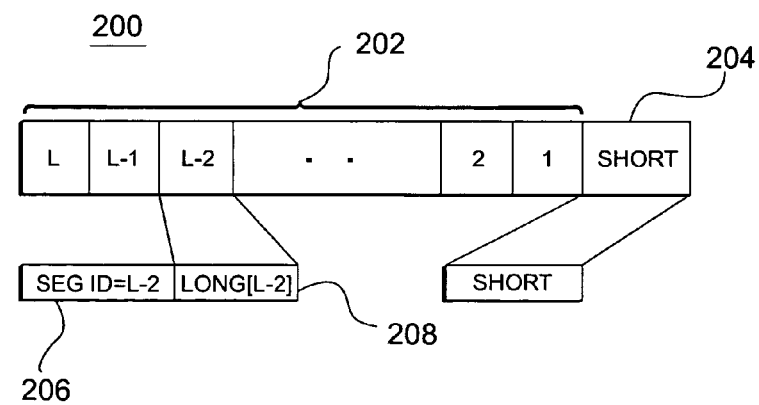
FIG. 2 is a diagram of a state vector having an example arrangement of state vector components.
Figure 3:
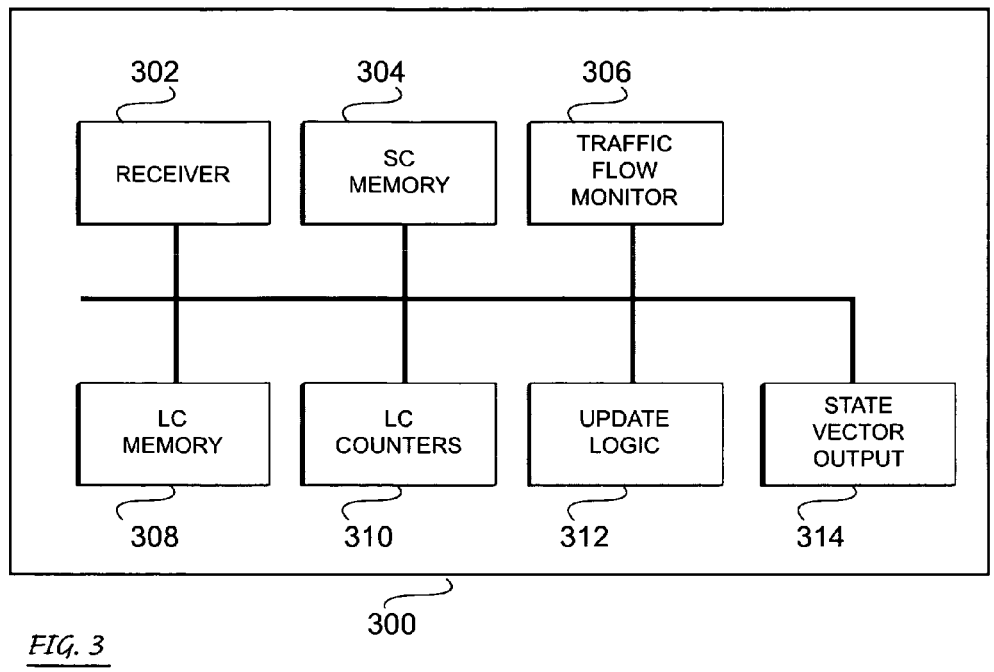
FIG. 3 is a schematic representation of a state vector processing architecture configured in accordance with an example embodiment of the invention.

FIG. 3 is a schematic representation of a state vector processing architecture 300 configured in accordance with an example embodiment of the invention. State vector processing architecture 300 may be implemented in any suitable receiver device that is configured to carry out the unordered state vector acquisition techniques described herein. State vector processing architecture 300 is suitably configured to generate the current state vector to enable the receiver device to successfully decrypt incoming data traffic. For example, state vector processing architecture 300 could be employed to generate state vector 108b as depicted in FIG. 1. State vector processing architecture 300 generally includes a receiver 302, a short component ("SC") memory 304, a traffic flow monitor 306, a long component ("LC") memory 308, one or more LC counters 310, update logic 312, and a state vector output element 314. These elements and components may be coupled together using any suitable interconnect architecture.

Receiver 302 is configured to receive state vector components (e.g., the short component and one or more long components) transmitted by the transmitting device. The state vector acquisition technique described herein can be practiced in connection with wired or wireless data communication systems. In practical embodiments, receiver 302 is designed to accommodate the particular data transmission protocol and formatting utilized by the data communication system. For example, receiver 302 may be configured to receive cryptographic synchronization messages that have been sent as independent frames or incorporated into frames of existing data. The synchronization messages may be transmitted using the data channel to be used for normal data traffic or transmitted using a separate data channel. The synchronization messages preferably include some form of error detection logic, data, or information to enable receiver 302 to determine whether the synchronization messages have been properly received in an uncorrupted state. Receiver 302 may include or communicate with processing logic that can read and interpret the segment ID field for each received state vector component such that state vector processing architecture 300 can identify the received components and handle them in an appropriate fashion.

State vector processing architecture 300 may include a suitable amount of memory, which may be allocated to SC memory 304, traffic flow monitor 306, LC memory 308, LC counters 310, state vector output element 314, and possibly update logic 312 as necessary. In practical embodiments, the memory can be realized as RAM memory, flash memory, ROM memory, EPROM memory, EEPROM memory, registers, a hard disk, a removable disk, or any other form of storage medium known in the art. Moreover, the steps of a method or algorithm described in connection with the embodiments disclosed herein may be embodied directly in hardware, in firmware, in a software module executed by a processor, or in any practical combination thereof, where the software module may also reside in the storage medium. In this regard, an exemplary storage medium can be coupled to a processor such that the processor can read information from, and write information to, the storage medium. In the alternative, the storage medium may be integral to the processor. As an example, the processor and the storage medium may reside in an ASIC.

SC memory 304 stores the received short component and maintains a current or updated short component value for state vector processing architecture 300. Similarly, LC memory 308 stores the received long components and maintains current or updated long component values for state vector processing architecture 300. Traffic flow monitor 306 is suitably configured to monitor the amount of incoming traffic. In practical embodiments, traffic flow monitor 306 increments with each unit of received data traffic. For example, if the system utilizes a 128-bit state vector (which is incremented once for every 128 bits of transmitted clear traffic), then traffic flow monitor 306 will increment once for every 128 bits of received traffic. Thus, in this example, the unit of data traffic equals 128 bits, which may correspond to one frame. Similarly, once initialized, each of the LC counters 310 are incremented in response to each unit of received data traffic. In practical embodiments, traffic flow monitor 306 and LC counters 310 may be realized as combined counter logic, or LC counters 310 may be responsive to traffic flow monitor 306. The values of LC counters 310 are utilized by state vector processing architecture 300 to construct a current state vector value based upon the received long components.

Update logic 312 represents processing that may be performed by state vector processing architecture 300. Briefly, update logic 312 is responsible for incrementing the received short component and for updating the received long components as necessary to construct the receiver state vector value. Update logic 312, and the various illustrative blocks, modules, processing logic, and circuits described in connection with the embodiments disclosed herein may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

Figure 5:
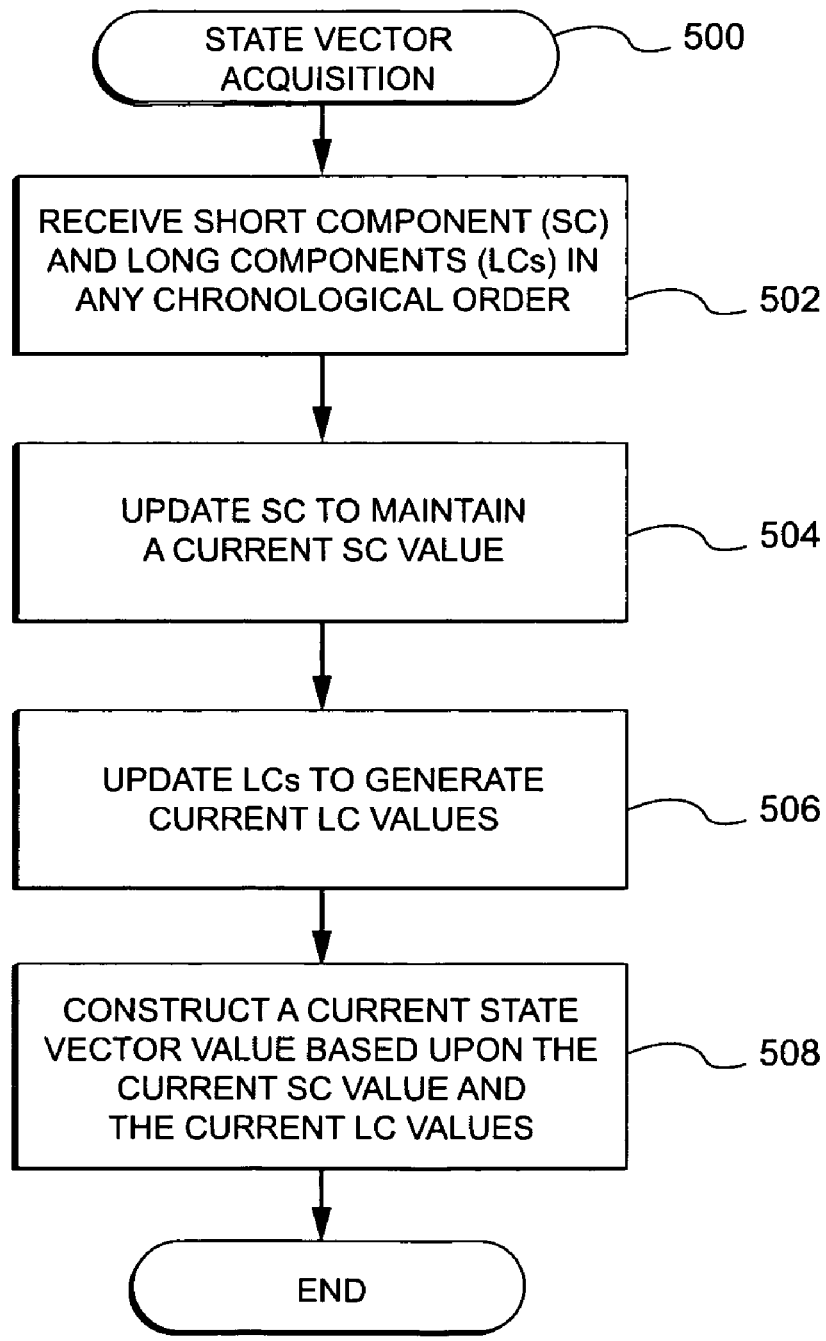
FIG. 5 is a flow chart depicting a state vector acquisition process according to an example embodiment of the invention.

The functionality of update logic 312 will be described in more detail below in connection with FIGS. 5-7.

State vector output element 314 is suitably configured to provide a state vector value to the decrypt engine employed by the receiver device. In this regard, state vector output element 314 may include or communicate with processing logic (such as update logic 312) that constructs the current state vector value based upon the received state vector components and based upon the long component counter values.

Figure 4:
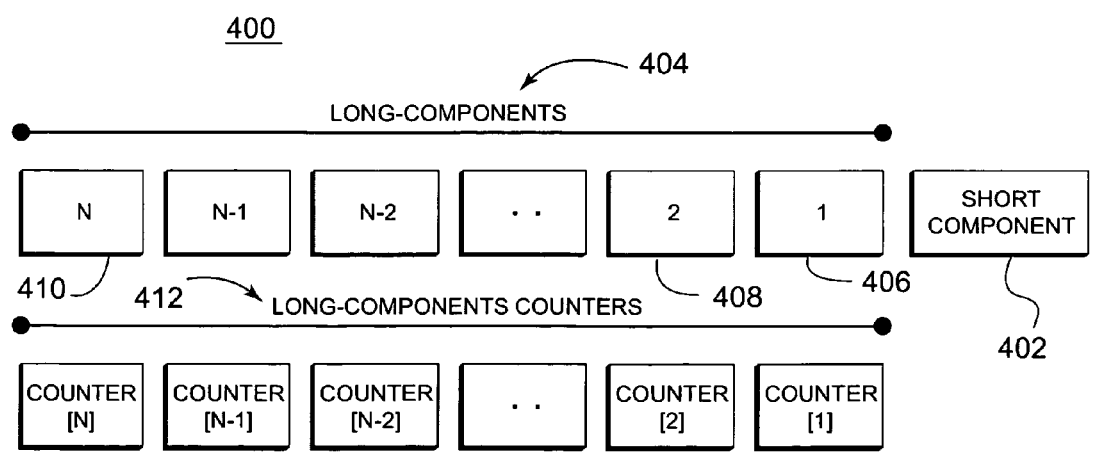
FIG. 4 is a schematic representation of a memory arrangement for state vector components and long component counters.

FIG. 4 is a schematic representation of a memory arrangement 400 for state vector components and long component counters. Again, a state vector may be partitioned into a short component 402 and a number (N) of long components 404. In this example, short component 402 includes the least significant bits of the state vector, the first long component 406 is the least significant of long components 404, the second long component 408 includes more significant bits relative to first long component 406, and so on, such that the N-th long component 410 includes the most significant bits of the state vector. The bits in short component 402 change most frequently, while the bits in N-th long component 410 change less frequently. Memory arrangement 400 is partitioned such that each long component 404 is saved in a respective field. In practice, the long component fields are initially populated with the received long components. Thereafter, the long component fields can be updated with current long component values as necessary during construction of the current state vector value.

The state vector length, the length of the short component, the number of long components, and the length of the long components are selected to suit the needs of the particular communication system requirements. In one simple example, a 128-bit state vector may be partitioned into a 16-bit short component and four 28-bit long components. In practice, however, the number of bits in each long component need not be the same, and the number of bits in the short component need not be less than the number of bits in the long components. Moreover, although practical embodiments process binary information, the state vector, the short component, and the long components need not be expressed in binary digits. For instance, the methodology described herein may apply to state vectors and state vector components that are expressed in hexadecimal digits, decimal digits, or any numerical base.

Memory arrangement 400 may also include fields for N counters 412, including a respective counter for each of the N long components 404. As mentioned above, each counter 412 is preferably initialized to zero upon receipt of its corresponding long component 404. Once initialized, a given counter 412 will increment in response to each received unit of data traffic, thus allowing the receiver device to maintain current counter values for long components 404. In this example embodiment, memory arrangement 400 is partitioned such that each counter value is saved in a respective field. These counter fields are updated with current counter values as necessary during the state vector acquisition procedure.

As mentioned above, the storage size of each long component counter 412 is preferably large enough such that the counter will not roll over before all of the state vector components have been received. The practical size of the counters 412 can be based upon empirical statistical data, test data, or by considering known limitations of the intended communication channel. For example, if the state vector includes three long components and one short component, then a minimum of four frames of traffic will be needed to successfully transmit the state vector. Thus, if it actually takes three repetitions to successfully receive all of the state vector components, then each counter must be able to count to at least twelve. Of course, the actual size of counters 412 may vary from one system to another depending upon the size of the state vectors and other practical considerations.

A receiver device configured in accordance with the invention may utilize state vector processing architecture 300 and memory arrangement 400 to support an unordered state vector acquisition methodology. In this regard, FIG. 5 is a flow chart depicting a state vector acquisition process 500 according to an example embodiment of the invention. The various tasks performed in connection with process 500 may be performed by software, hardware, firmware, or any combination thereof. For illustrative purposes, the following description of process 500 may refer to elements mentioned above in connection with FIGS. 1-4. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein.

State vector acquisition process 500 assumes that encryption keys have already been negotiated (or will be successfully negotiated) between the transmitting device and the receiving device. Process 500 receives the short component and the long components in any chronological order (task 502), where the short component corresponds to the least significant bits of the state vector, and the long components correspond to more significant bits of the state vector. In practical embodiments, a state vector component is transmitted in a packet that contains an error detection value (such as a CRC value) and an identifier that informs the receiver device that the packet includes state vector information. As mentioned above in connection with FIG. 2, the packet might also include a segment ID that identifies whether the packet conveys the short component or a given long component. This segment ID enables the receiving device to distinguish the state vector packets from data traffic packets. The receiving device processes the error detection value using conventional techniques to determine whether the packet was corrupted during transmission. If the packet was corrupted, then the receiving device disregards the packet and process 500 does not consider the corresponding state vector component to be "received." Alternatively, error detection techniques and suitably configured error detection values may be utilized to convey segment ID information (rather than processing a distinct segment ID as described above). For example, specific error detection values may be chosen in a manner that enables the receiving device to resolve the respective segment ID based upon the resolved error detection value.

Once the short component is received, its value is updated in response to traffic flow monitor 306 to maintain a current short component value (task 504). Notably, task 504 may be performed before task 502 is completed. The short component value is updated in response to each received unit of data traffic. In practice, task 504 increments the short component value once for each incoming frame of data traffic. After completion of task 502 (i.e., after all of the long components have been received in any temporal order), state vector acquisition process 500 updates the long components as necessary to generate current long component values (task 506). As described in more detail below, the long components are updated based upon their respective times of receipt. In addition, process 500 constructs a current state vector value based upon the current short component value and the current long component values (task 508). This current state vector value is synchronized with the state vector generated at the transmitting device, thus enabling the receiver device to correctly decrypt the incoming encrypted data traffic.

Figure 6:
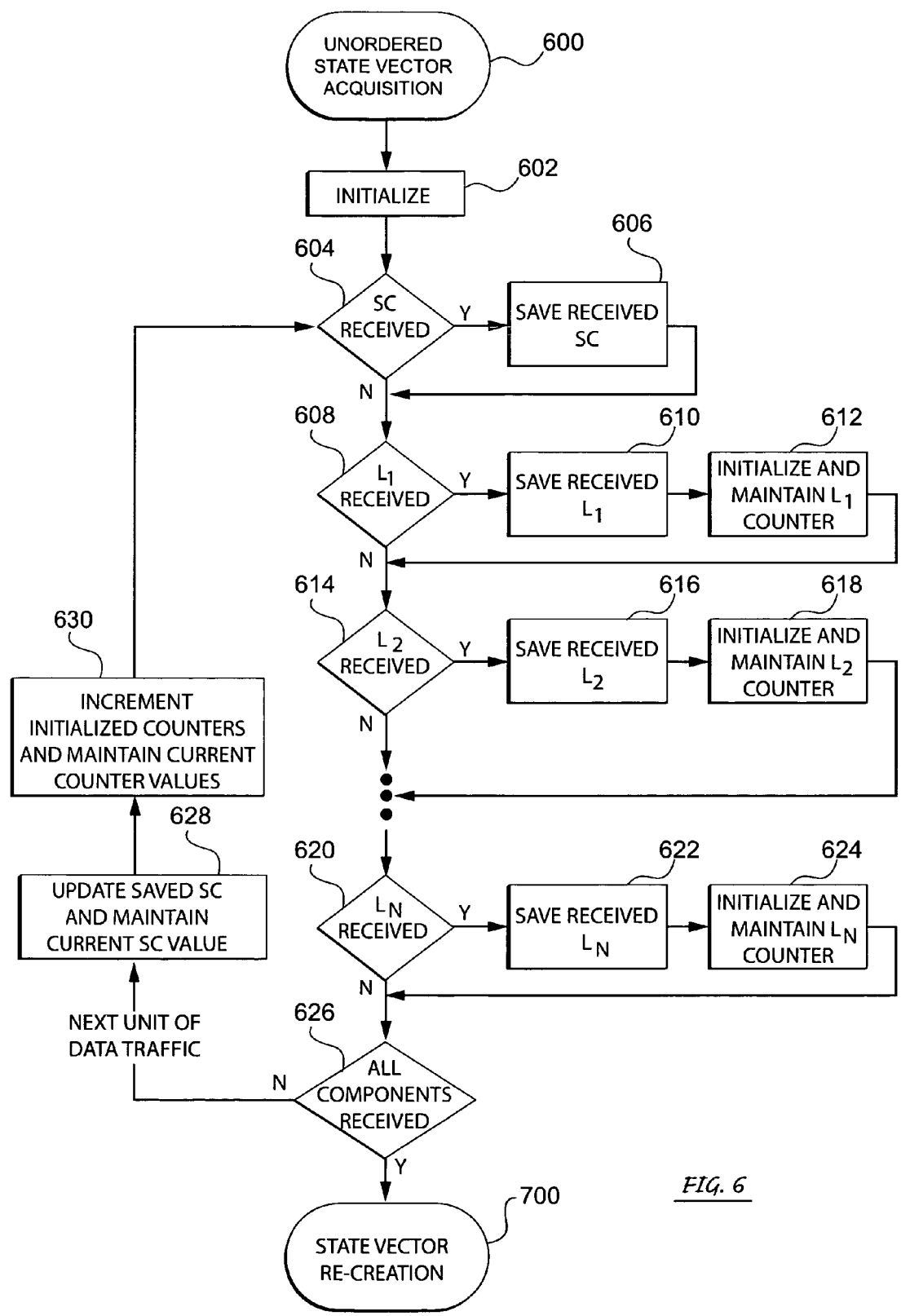
FIG. 6 is a flow chart depicting an unordered state vector acquisition process according to an example embodiment of the invention.
Figure 7:
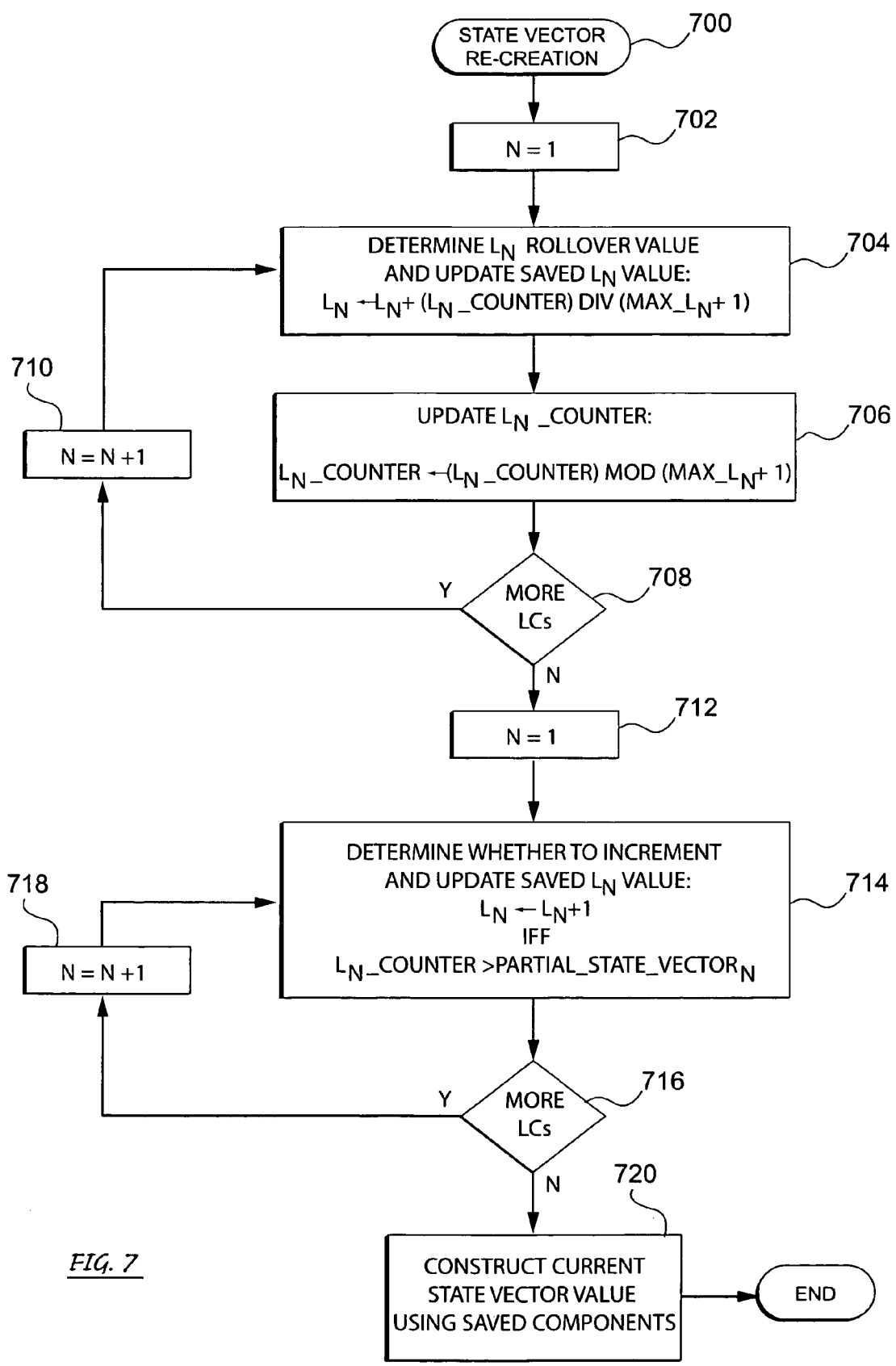
FIG. 7 is a flow chart depicting a state vector re-creation process according to an example embodiment of the invention.

FIG. 6 is a flow chart depicting an unordered state vector acquisition process 600 according to an example embodiment of the invention. Process 600 may be performed during state vector acquisition process 500, for example, during tasks 502 and 504. The various tasks performed in connection with process 600 may be performed by software, hardware, firmware, or any combination thereof. For illustrative purposes, the following description of process 600 may refer to elements mentioned above in connection with FIGS. 1-4. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein.

Unordered state vector acquisition process 600 assumes that the state vector includes one short component and a number (N) of long components. Unordered state vector acquisition process 600 may begin by initializing one or more components of the receiver device (task 602). For example, task 602 may clear SC memory 304, traffic flow monitor 306, LC memory 308, LC counters 310, and/or state vector output element 314 (see FIG. 3). Process 600 then attempts to obtain all of the state vector components, but need not receive the components in any particular order. For example, if the short component is received (query task 604), then process 600 will save the received short component as the current short component value (task 606). If, however, long component $L_1$ is received (query task 608), then process 600 will save the received $L_1$ as the current $L_1$ value (task 610). In addition, process 600 will initialize and maintain the $L_1$ counter (task 612) in response to the receipt of $L_1$. In this example, initializing a long component counter sets that long component counter to a value of zero. If, however, long component $L_2$ is received (query task 614), then process 600 will save the received $L_2$ as the current $L_2$ value (task 616). In addition, process 600 will initialize and maintain the $L_2$ counter (task 618) in response to the receipt of $L_2$. In this manner, process 600 "listens" for the state vector components to be received in any order, saves the received long component values, and initializes the long component counters as necessary. In FIG. 6, query task 620, task 622, and task 624 correspond to the most significant long component, i.e., $L_N$. In a practical embodiment, the monitoring for received state vector components need not be performed in any specified order and, indeed, the monitoring may be performed in a parallel manner. The flow chart of FIG. 6 merely represents one example that is easy to illustrate.

After unordered state vector acquisition process 600 has checked for the receipt of state vector components, it may perform a query task 626 to determine whether all of the state vector components have been received. If so, then process 600 may prompt a state vector re-creation process 700 (see FIG. 7). If not, then process 600 will continue monitoring for the state vector components. After receipt of another predefined unit of data traffic, process 600 may update the saved short component and maintain the current short component value (task 628). In the example embodiment, task 628 increments the current short component value by one bit in response to each received unit of data traffic. Alternate embodiments may utilize a different scheme for incrementing the short component value. Incrementing of the short component value occurs independently and without affecting any of the received long components. Task 628 is bypassed if a short component has not yet been received. In addition, initialized long component counters are incremented to maintain current counter values (task 630). In the example embodiment, task 630 increments each initialized counter by one bit in response to each received unit of data traffic. Alternate embodiments may utilize a different scheme for incrementing the counters. Task 630 is bypassed if no long components have been received. Following task 630, process 600 may be re-entered at query task 604 to continue monitoring for the state vector components.

Notably, process 600 enables the receiver device to receive the state vector components in any order. If a newer version of any previously received component is received before all of the components have been received, then the newer version of that component will replace the older version and, if the newly received component is a long component, the respective counter will be reset to zero. Although this feature is not a requirement of the invention, it may be desirable in practical embodiments to reduce the size of the counters. Again, once all of the state vector components have been received (query task 626), process 600 ends and the receiver device can proceed to re-create the current state vector value.

A receiver device configured in accordance with an example embodiment of the invention constructs the current state vector value based upon the current short component value, the received long component values, and the current long component counter values. The received long component values and the current long component counter values are suitably processed to obtain current long component values that can be "combined" with the current short component value to construct the current state vector value. FIG. 7 is a flow chart depicting a state vector re-creation process 700 according to an example embodiment of the invention. Process 700 may be performed in conjunction with unordered state vector acquisition process 600 to obtain the current state vector value. The various tasks performed in connection with process 700 may be performed by software, hardware, firmware, or any combination thereof. For illustrative purposes, the following description of process 700 may refer to elements mentioned above in connection with FIGS. 1-4. It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein.

State vector re-creation process 700 begins after the short component and all of the long components have been received, in any chronological order. At this time, the current short component value is updated as follows: SC←SC+1. The short component is incremented at this time in response to the natural flow of traffic and because (in the example embodiments) the receiving device operates one "count" behind the transmitter device. Thus, the "temporary" state vector value at this time includes this updated short component value along with all of the received long component values, arranged in order from the least significant long component (i.e., $L_1$) to the most significant long component (i.e., $L_N$). Process 700 updates the long components as necessary to reflect any long component rollovers that may have occurred while all of the state vector components were being received.

For ease of description, state vector re-creation process 700 is presented as an iterative procedure. In practice, some of the iterative tasks of process 700 may be performed concurrently or in parallel, depending upon the processing logic utilized by the receiver device. For this iterative example, process 700 begins with the lowest numbered long component by setting a variable (n) equal to one (task 702), where $1 \leq n \leq N$. Process 700 determines whether the current $L_1$ counter value indicates that the received $L_1$ should be rolled over. In other words, if the current $L_1$ counter value indicates a long passage of time, then the current $L_1$ value may need to be updated to reflect multiple rollovers (i.e., the maximum possible value for $L_1$ was exceeded at least twice). In the example embodiment, process 700 calculates a rollover value that corresponds to a number of rollovers for the received $L_1$. More particularly, process 700 calculates a multi-rollover value that identifies whether the received $L_1$ rolled over multiple times. Eventually, the overall current state vector value will be constructed in response to this rollover value. Process 700 may determine the $L_1$ multi-rollover value by dividing the current counter value for $L_1$ by the quantity (MAX_$L_1$+1) to obtain an $L_1$ integer quotient. The integer quotient represents the multi-rollover value for the current $L_1$ value. In other words:

$$\text{Multi-Rollover Value} = (L_1\_\text{Counter}) \text{DIV} (\text{MAX}\_L_1 + 1).$$

In this expression, MAX_$L_1$ is the maximum possible value represented by $L_1$. For example, if the state vector cycles between decimal values of 0000 and 9999, the short component is the least significant digit, and $L_1$, $L_2$, and $L_3$ are the remaining digits in order of significance, then MAX_$L_1$ is 9, MAX_$L_2$ is 99, and MAX_$L_3$ is 999. If the state vector cycles between binary values of 00000000 and 11111111, the short component includes the two least significant bits, $L_1$ includes the two higher order bits above the short component, $L_2$ includes the two higher order bits above $L_1$, and $L_3$ includes the two most significant bits, then MAX_$L_1$ is binary 1, MAX_$L_2$ is binary 1111, and MAX_$L_3$ is binary 111111.

The current $L_1$ value is then incremented by the calculated multi-rollover value, while disregarding any resulting carry-over. In other words, $L_1$ is simply incremented in an independent manner without affecting the received $L_2$ value. For example, if the received $L_1$ value is binary 1110 and the calculated multi-rollover value is two, then the current $L_1$ value will be incremented to binary 10000 and the carry-over digit is discarded, resulting in a new $L_1$ value of binary 0000. As another example, if the received $L_1$ value is binary 0010 and the calculated multi-rollover value is one, then the current $L_1$ value will be incremented to binary 0011, which results in a new $L_1$ value of binary 0011 (there is no carry-over digit in this second example). Updating of the saved $L_1$ value is performed during task 704.

In addition, the current $L_1$ counter value is updated with the $L_1$ remainder of the above operation. In other words:

$$L_1\_\text{Counter} \leftarrow (L_1\_\text{Counter}) \text{MOD}(\text{MAX}\_L_1 + 1).$$

The updated counter value is saved for subsequent processing. Updating of the current $L_1$ counter value is performed during task 706. For implementations where it is known that all of the long components will be received in less time than it takes for the short component to go from zero to its maximum value, the first iteration of the above modulo operation is unnecessary because it is only possible for any of the long components to have rolled over once during that time period.

Tasks 704 and 706 are performed for each long component and its respective counter. In this regard, if more long components remain for processing (query task 708), then the variable n is incremented by one (task 710) such that the next long component can be processed in the manner described above. If query task 708 determines that no additional long components remain for processing, then state vector re-creation process 700 may proceed to a task 712.

In practical embodiments, the processing loop represented by tasks 702, 704, 706, 708, and 710 need not always be performed. Namely, this processing loop is performed if the storage size of the counter for the current long component is larger than the storage size for the long component itself, since the maximum passage of time represented by the counter may account for multiple rollovers in the received long component. If, on the other hand, the size of the counter for the current long component does not exceed the size of the long component itself, then this processing loop can be bypassed or simply not implemented in the receiving device.

Regardless of whether the processing loop represented by tasks 702, 704, 706, 708, and 710 is performed, state vector re-creation process 700 will eventually perform task 712. Again, FIG. 7 depicts an iterative procedure for ease of description. Accordingly, task 712 sets the variable n to one, where $1 \le n \le N$. The remainder of process 700 represents a "partial" state vector comparison, where the current state vector value (to the extent it has been constructed) is compared to a specified long component counter value to determine whether the long component value corresponding to the specified counter needs to be incremented. In other words, this portion of process 700 determines, for a given long component, whether the previous component has rolled over, thus forcing a carry-over for the given long component. In contrast to the first portion of process 700, which contemplates multiple rollovers, the second portion of process 700 contemplates a maximum rollover of one. In this example embodiment, the state vector components are resolved in their order of significance, from least significant to most significant.

For the initial iteration, state vector re-creation process 700 determines whether it is necessary to increment the currently saved $L_1$ value and, if so, process 700 will update the current $L_1$ value (task 714). In this example embodiment, process 700 compares the current short component value to the current counter value for $L_1$, and increments $L_1$ by one if the current $L_1$ counter value is greater than the current short component value (while disregarding any resulting carry-over). In other words:

$$L_1 \leftarrow L_1 + 1; \text{ iff } L_1\_\text{Counter} > \text{Partial\_State\_Vector}_1.$$

In the above expression, the term Partial_State_Vector$_1$ represents the currently saved short component value, which corresponds to the partially constructed state vector value at this time. The incrementing of $L_1$ results in an updated $L_1$ value, which is saved for subsequent processing. Any carry-over resulting from the incrementing of $L_1$ is disregarded. In other words, $L_1$ is simply incremented in an independent manner without affecting the saved $L_2$ value. For example, if the current $L_1$ value is binary 11111 and task 714 determines that $L_1$ ought to be incremented, then the incremented $L_1$ value will be binary 100000, the carry-over digit is discarded, and the updated $L_1$ value will be binary 00000. As another example, if the current $L_1$ value is binary 00101 and task 714 determines that $L_1$ ought to be incremented, then the incremented $L_1$ value will be binary 00110, no carry-over digit results, and the updated $L_1$ value will be binary 00110.

Task 714 is repeated for each long component and a respective partial state vector. In this regard, if more long components remain for processing (query task 716), then the variable n is incremented by one (task 718) such that the next long component can be processed in the manner described above. For the next iteration of task 714, the current $L_2$ counter value is compared to Partial_State_Vector$_2$. State vector re-creation process 700 forms Partial_State_Vector$_2$ by combining the currently saved short component value with the currently saved $L_1$ value (which may or may not have been updated in the previous iteration of task 714). For example, if the current short component value is binary 0101 and the current $L_1$ value is binary 00101, then Partial_State_Vector$_2$ will be binary 001010101. Likewise, Partial_State_Vector$_3$ represents a combination of the current short component value, the current $L_1$ value, and the current $L_2$ value (which may or may not have been updated by the respective iteration of task 714). Task 714 is repeated for N iterations such that all of the long components can be updated and saved.

If query task 716 determines that no additional long components remain for processing, then state vector re-creation process 700 may construct the current state vector value using the saved component values (task 720). As mentioned previously, task 720 may generate the current state vector value by combining the currently saved short component value and the currently saved long component values in accordance with the structure depicted in FIG. 4. Once the current state vector value has been obtained, the receiver device can proceed to decrypt the incoming data traffic in a conventional manner as described above in connection with FIG. 1.

UNORDERED STATE VECTOR ACQUISITION EXAMPLES

The following examples illustrate the state vector acquisition technique described above. For simplicity, these examples utilize decimal numbers rather than binary or hexadecimal notation. Practical embodiments will typically be configured for processing of binary numbers, and those skilled in the art should readily understand that the following examples can be equivalently translated into binary notation. For each of the examples the state vector is four decimal digits long (having a minimum value of 0000 and a maximum value of 9999), where each digit represents a state vector component. In other words, the short component corresponds to the least significant digit, and three long components respectively correspond to the remaining higher digits. Typical state vectors are much larger than this, but the concepts described herein can be equivalently applied to state vectors of any length, to state vectors having any number of components, and to state vector components having any lengths.

Example 1

No Long Component Rollovers

FIG. 8 is a diagram that illustrates an example unordered state vector acquisition procedure where no state vector component rollovers occur during acquisition. The transmitter device starts the communication (arbitrarily designated at a time t=0 for this example) with a state vector of 1234, and the receiver device begins attempting to reconstitute the transmitter device state vector. In this example, the initial state vector value for the receiver is set to all zeros for clarity, however, in practical embodiments the initial state vector value is either undefined or is treated as a "don't care" condition.

In practical implementations, the receiver device is usually a frame or two behind the transmitter device, as it takes time for the data to flow through the communication channel. As such, in FIG. 8, the columns labeled "Transmitter State Vector" and "Transmission" represent items that are occurring at the present time. On the other hand, the column labeled "Receiver State Vector" represents the response of the receiver device corresponding to that which was received for the previous time index, i.e., a one-frame delay.

More specifically, at time t=0, the transmitter state vector value is 1234, and the transmitter device sends the short component value of SC=4 to the receiver device. In this example, the value of SC=4 is successfully received by the receiver device, which incorporates it into the receiver state vector at time t=1 (at this time, the receiver state vector is 0004). At time t=1, the transmitter state vector value is 1235, and the transmitter device attempts to send the first long component value of $L_1$=3 to the receiver device. The transmission of $L_1$=3, however, is corrupted in transit such that the receiver device does not successfully receive it. Consequently, the value of $L_1$=3 is not saved by the receiver device and the value is not incorporated into the receiver state vector at time t=2. Rather, at time t=2, the receiver state vector is 0005, which merely reflects the updating of the previously received short component. For this example, $L_2$=2 is transmitted at time t=2 (and incorporated into the receiver state vector at time t=3), $L_3$=1 is transmitted at time t=3 (and incorporated into the receiver state vector at time t=4),), SC=8 is transmitted at time t=4 (and incorporated into the receiver state vector at time t=5), and the final long component $L_1$=3 is transmitted at time t=5 (and incorporated into the receiver state vector at time t=6).

At this point, the receiver device obtains the final missing long component, namely, $L_1$, and the receiver device can proceed with the re-creation and construction of the transmitter state vector. First, the receiver device will incorporate the received $L_1$ value and increment the short component value to obtain a "temporary" state vector of 1239 (this value is depicted as the final entry in FIG. 8). In this simple example, it is easy to see that the receiver state vector already matches the transmitter state vector. Of course, a practical receiver device will not have such a priori knowledge. Accordingly, the state vector acquisition process will be carried out nonetheless.

The first step is to determine how many times each long component has rolled over since it was received, if more than once (see above description of tasks 704 and 706 in state vector re-creation process 700). For this example, assume that the storage size of each long component counter is very large such that this step is necessary.

For $L_1$, the maximum value is 9 and, therefore, $MAX\_L_1$+1=10. Consequently, $L_1 \leftarrow L_1 + [(L_1\_Counter) DIV (MAX\_L_1+1)]$;

$L_1 \leftarrow 3 + (0 \text{ DIV } 10)$;

$L_1 \leftarrow 3 + 0$;

$L_1 \leftarrow 3$.

In other words, the current $L_1$ value does not change. As described above, the current $L_1$ counter value may need to be updated:

$L_1\_Counter \leftarrow [(L_1\_Counter) MOD (MAX\_L_1+1)]$;

$L_1\_Counter \leftarrow 0 \text{ MOD } 10$;

$L_1\_Counter \leftarrow 0$.

In other words, the current $L_1\_Counter$ value does not change.

For $L_2$, the maximum value is 99 and, therefore, $MAX\_L_2$+1=100. Consequently, $L_2 \leftarrow L_2 + [(L_2\_Counter) DIV (MAX\_L_2+1)]$;

$L_2 \leftarrow 2 + (3 \text{ DIV } 100)$;

$L_2 \leftarrow 2 + 0$;

$L_2 \leftarrow 2$.

In other words, the current $L_2$ value does not change. As described above, the current $L_2$ counter value may need to be updated:

$L_2\_Counter \leftarrow [(L_2\_Counter) MOD(MAX\_L_2+1)]$;

$L_2\_Counter \leftarrow 3\ MOD\ 100$;

$L_2\_Counter \leftarrow 3$.

In other words, the current $L_2\_Counter$ value does not change.

For $L_3$, the maximum value is 999 and, therefore, $MAX\_L_3+1=1000$. Consequently, $L_3 \leftarrow L_3 + [(L_3\_Counter) DIV(MAX\_L_3+1)]$;

$L_3 \leftarrow 1 + (2\ DIV\ 1000)$;

$L_3 \leftarrow 1 + 0$;

$L_3 \leftarrow 1$.

In other words, the current $L_3$ value does not change. As described above, the current $L_3$ counter value may need to be updated:

$L_3\_Counter \leftarrow [(L_3\_Counter) MOD(MAX\_L_3+1)]$;

$L_3\_Counter \leftarrow 2\ MOD\ 1000$;

$L_3\_Counter \leftarrow 2$.

In other words, the current $L_3\_Counter$ value does not change.

Accordingly, the summary thus far is that none of the received long components has changed, and none of the long component counters has incremented past its respective maximum (i.e., none of the long component counters has changed).

The second step is to determine whether any of the counters indicate that a long component has rolled over (see above description of task 714 in state vector re-creation process 700).

For the first iteration, the short component represents the partial state vector, and:

$L_1 \leftarrow L_1 + 1 (iff L_1\_Counter > Partial\_State\_Vector[SC])$;

$L_1 \leftarrow L_1 + 1 (iff\ 0 > 9)$;

$L_1 \leftarrow L_1$;

$L_1 \leftarrow 3$.

In other words, the current $L_1$ value does not change and the receiver device may construct the current state vector value using this current $L_1$ value.

For the second iteration, the short component combined with the first long component represents the partial state vector, and:

$L_2 \leftarrow L_2 + 1 (iff L_2\_Counter > Partial\_State\_Vector[L_1 + SC])$;

$L_2 \leftarrow L_2 + 1 (iff\ 3 > 39)$;

$L_2 \leftarrow L_2$;

$L_2 \leftarrow 2$.

In other words, the current $L_2$ value does not change and the receiver device may construct the current state vector value using this current $L_2$ value.

For the third iteration, the short component combined with the first and second long components represents the partial state vector, and:

$L_3 \leftarrow L_3 + 1 (iff L_3\_Counter > Partial\_State\_Vector[L_2 + L_1 + SC])$;

$L_3 \leftarrow L_3 + 1 (iff\ 2 > 239)$;

$L_3 \leftarrow L_3$;

$L_3 \leftarrow 1$.

In other words, the current $L_3$ value does not change and the receiver device may construct the current state vector value using this current $L_3$ value. At this time, the receiver device has acquired the correct state vector value, namely, 1239, and the receiver device can begin to decrypt traffic received from the transmitter device.

Example 2

No Multiple Long Component Rollovers

FIG. 9 is a diagram that illustrates an example unordered state vector acquisition procedure where multiple long component rollovers do not occur, but where at least one long component rolls over once during acquisition. In this example, the transmitter device starts the communication (arbitrarily designated at a time t=0) with a state vector of 8997, and the receiver device begins attempting to reconstitute the transmitter device state vector.

More specifically, at time t=0, the transmitter state vector value is 8997, and the transmitter device sends the short component value of SC=7 to the receiver device. In this example, the value of SC=7 is successfully received by the receiver device, which incorporates it into the receiver state vector at time t=1 (at this time, the receiver state vector is 0007). At time t=1, the transmitter state vector value is 8998, and the transmitter device attempts to send the first long component value of $L_1$=9 to the receiver device. The transmission of $L_1$=9, however, is corrupted in transit such that the receiver device does not successfully receive it. Consequently, the value of $L_1$=9 is not saved by the receiver device and the value is not incorporated into the receiver state vector at time t=2. Rather, at time t=2, the receiver state vector is 0008, which reflects the updating of the previously received short component. For this example, $L_2$=9 is transmitted at time t=2 (and incorporated into the receiver state vector at time t=3), $L_3$=9 is transmitted at time t=3 (and incorporated into the receiver state vector at time t=4), SC=1 is transmitted at time t=4 (and incorporated into the receiver state vector at time t=5), and the final long component $L_1$=0 is transmitted at time t=5 (and incorporated into the receiver state vector at time t=6).

At this point, the receiver device obtains the final missing long component, namely, $L_1$, and the receiver device can proceed with the re-creation and construction of the transmitter state vector. First, the receiver device will incorporate the received $L_1$ value and increment the short component value to obtain a "temporary" state vector of 9902 (this value is depicted as the final entry in FIG. 9). In this simple example, it is easy to see that the receiver state vector does not match the transmitter state vector, which is 9002. Accordingly, the state vector acquisition process will need to update at least one component.

The first step is to determine how many times each long component has rolled over since it was received, if more than once (see above description of tasks 704 and 706 in state vector re-creation process 700). Since no counter is greater than its respective maximum value plus one (as in the previous example), no long component has rolled over multiple times. For the sake of brevity, the detailed mathematics will not be described for this example. Thus, after the first step, the receiver state vector will still be 9902 and the long component counters will still contain their respective values as shown at time t=5.

The second step is to determine whether any of the counters indicate that a long component has rolled over once (see above description of task 714 in state vector re-creation process 700).

For the first iteration, the short component represents the partial state vector, and:

$L_1 \leftarrow L_1+1 (iff L_1\_Counter>Partial\_State\_Vector[SC])$;

$L_1 \leftarrow L_1+1 (iff 0>2)$;

$L_1 \leftarrow L_1$;

$L_1 \leftarrow 0$.

In other words, the current $L_1$ value does not change and the receiver device may construct the current state vector value using this current $L_1$ value.

For the second iteration, the short component combined with the first long component represents the partial state vector, and:

$L_2 \leftarrow L_2+1 (iff L_2\_Counter>Partial\_State\_Vector[L_1+SC])$;

$L_2 \leftarrow L_2+1 (iff 3>02)$;

$L_2 \leftarrow 9+1$ (discard carry);

$L_2 \leftarrow 0$.

In this example, the original $L_2$ value is 9, and the new $L_2$ value would appear to be 10. As described above, however, increments to any long component are limited to only that particular long component (in either step of the procedure), and increments do not affect higher order long components. Accordingly, in this example, the new $L_2$ value becomes 0 and the higher order carry digit is disregarded. At this point, the receiver device may construct the current state vector value using this updated $L_2$ value.

For the third iteration, the short component combined with the first and second long components represents the partial state vector, and:

$L_3 \leftarrow L_3+1 (iff L_3\_Counter>Partial\_State\_Vector[L_2+L_1+SC])$;

$L_3 \leftarrow L_3+1 (iff 2>002)$;

$L_3 \leftarrow L_3$;

$L_3 \leftarrow 9$.

Notably, this iteration utilizes the updated $L_2$ value of 0 rather than the received $L_2$ value of 9. For this iteration, the current $L_3$ value does not change and the receiver device may construct the current state vector value using this current $L_3$ value. At this time, the receiver device has acquired the correct state vector value, namely, 9002, and the receiver device can begin to decrypt traffic received from the transmitter device.

Example 3

Multiple Long Component Rollovers

FIG. 10 is a diagram that illustrates an example unordered state vector acquisition procedure where at least one long component rolls over multiple times. In contrast to the previous two examples, this example illustrates the processing performed during the first portion of state vector re-creation process 700. Here, the transmitter device starts the communication (arbitrarily designated at a time t=0) with a state vector of 8997, and the receiver device begins attempting to reconstitute the transmitter device state vector.

More specifically, at time t=0, the transmitter state vector value is 8997, and the transmitter device sends the short component value of SC=7 to the receiver device. In this example, the value of SC=7 is successfully received by the receiver device, which incorporates it into the receiver state vector at time t=1 (at this time, the receiver state vector is 0007). At time t=1, the transmitter state vector value is 8998, and the transmitter device sends the long component value of $L_1$=9 to the receiver device, and the $L_1$ value is incorporated into the receiver state vector at time t=2. At time t=2, the transmitter state vector value is 8999, and the transmitter device attempts to send the second long component value of $L_2$=9 to the receiver device. The transmission of $L_2$=9, however, is corrupted in transit such that the receiver device does not successfully receive it. Consequently, the value of $L_2$=9 is not saved by the receiver device and the value is not incorporated into the receiver state vector at time t=3. Rather, at time t=3, the receiver state vector is 0099, which merely reflects the updating of the short component. For this example, $L_3$=9 is transmitted at time t=3 (and incorporated into the receiver state vector at time t=4).

The example of FIG. 10 assumes that another 11 frames pass and that all long components were corrupted in transit during this time. Thus, the next entry in FIG. 10 corresponds to time t=14. Notably, the short component has continued to increment during this period, the $L_1$ counter and the $L_3$ counter have continued to increment during this period, and the $L_2$ value has not yet been received. Moreover, the rollover in the short component did not affect the current $L_1$ value in the receiver state vector. At time t=14, the transmitter device transmits the final long component, $L_2$=0, and the receiver device incorporates it into the receiver state vector at time t=15.

At this point, the receiver device obtains the final missing long component, namely, $L_2$, and the receiver device can proceed with the re-creation and construction of the transmitter state vector. First, the receiver device will incorporate the received $L_2$ value and increment the short component value to obtain a "temporary" state vector of 9091 (this value is depicted as the final entry in FIG. 10). As shown in FIG. 10, the current $L_1$ counter value is 13, the current $L_2$ counter value is 0, and the current $L_3$ counter value is 11. In this example, it is easy to see that the receiver state vector does not match the transmitter state vector, which is 9011. Accordingly, the state vector acquisition process will need to update at least one component.

The first step is to determine how many times each long component has rolled over since it was received, if more than once (see above description of tasks 704 and 706 in state vector re-creation process 700). For this example, assume that the storage size of each long component counter is very large such that this step is necessary.

For $L_1$, the maximum value is 9 and, therefore, MAX_$L_1$+1=10. Consequently, $L_1 \leftarrow L_1 + [(L_1\_Counter) DIV (MAX\_L_1+1)]$;

$L_1 \leftarrow 9+(13\ DIV\ 10)$;

$L_1 \leftarrow 9+1$ (discard carry);

$L_1 \leftarrow 0$.

Here, the current $L_1$ value rolls over to 0 and the higher order carry digit of 1 is disregarded. This update indicates that the actual $L_1$ value has rolled over multiple times (namely, twice). Notably, the new $L_1$ value is saved for use in subsequent processing. The next step in the state vector re-creation process compensates for the second rollover. Again, the current $L_1$ counter value may need to be updated:

$L_1\_Counter \leftarrow [(L_1\_Counter)MOD(MAX\_L_1+1)]$;

$L_1\_Counter \leftarrow 13\ MOD\ 10$;

$L_1\_Counter \leftarrow 3$.

In other words, the current $L_1$_Counter value is updated from 13 to 3, and this new $L_1$_Counter value is used in subsequent processing.

For $L_2$, the maximum value is 99 and, therefore, $MAX\_L_2+1=100$. Consequently, $L_2 \leftarrow L_2 + [(L_2\_Counter)DIV(MAX\_L_2+1)]$;

$L_2 \leftarrow 0 + (0\ DIV\ 100)$;

$L_2 \leftarrow 0 + 0$;

$L_2 \leftarrow 0$.

In other words, the current $L_2$ value does not change. As described above, the current $L_2$ counter value may need to be updated:

$L_2\_Counter \leftarrow [(L_2\_Counter)MOD(MAX\_L_2+1)]$;

$L_2\_Counter \leftarrow 0\ MOD\ 100$;

$L_2\_Counter \leftarrow 0$.

In other words, the current $L_2$_Counter value does not change.

For $L_3$, the maximum value is 999 and, therefore, $MAX\_L_3+1=1000$. Consequently, $L_3 \leftarrow L_3 + [(L_3\_Counter)DIV(MAX\_L_3+1)]$;

$L_3 \leftarrow 9 + (11\ DIV\ 1000)$;

$L_3 \leftarrow 9 + 0$;

$L_3 \leftarrow 9$.

In other words, the current $L_3$ value does not change. As described above, the current $L_3$ counter value may need to be updated:

$L_3\_Counter \leftarrow [(L_3\_Counter)MOD(MAX\_L_3+1)]$;

$L_3\_Counter \leftarrow 11\ MOD\ 1000$;

$L_3\_Counter \leftarrow 11$.

In other words, the current $L_3$_Counter value does not change.

Accordingly, the summary thus far is that both $L_1$ and $L_1$_Counter changed, and that the rest of the parameters have remained the same.

The second step is to determine whether any of the counters indicate that a long component has rolled over (see above description of task 714 in state vector re-creation process 700).

For the first iteration, the short component represents the partial state vector, and:

$L_1 \leftarrow L_1 + 1 (iff\ L_1\_Counter > Partial\_State\_Vector[SC])$;

$L_1 \leftarrow L_1 + 1 (iff\ 3 > 1)$;

$L_1 \leftarrow 0 + 1$;

$L_1 \leftarrow 1$.

This iteration utilizes the updated value of $L_1=0$ and the updated value of $L_1$_Counter=3. As a result of this operation, the current $L_1$ value is incremented again and the updated value of $L_1=1$ is used by the receiver device to construct the current state vector value.

For the second iteration, the short component combined with the first long component represents the partial state vector, and:

$L_2 \leftarrow L_2 + 1 (iff\ L_2\_Counter > Partial\_State\_Vector[L_1+SC])$;

$L_2 \leftarrow L_2 + 1 (iff\ 0 > 11)$;

$L_2 \leftarrow L_2$;

$L_2 \leftarrow 0$.

This iteration utilizes the new value of $L_1=1$ in the partial state vector. As a result of this operation, the current $L_2$ value does not change and the receiver device may construct the current state vector value using the current $L_2$ value of 0.

For the third iteration, the short component combined with the first and second long components represents the partial state vector, and:

$L_3 \leftarrow L_3 + 1 (iff\ L_3\_Counter > Partial\_State\_Vector[L_2+L_1+SC])$;

$L_3 \leftarrow L_3 + 1 (iff\ 11 > 011)$;

$L_3 \leftarrow L_3$;

$L_3 \leftarrow 9$.

This iteration also utilizes the new value of $L_1=1$ in the partial state vector. As a result of this operation, the current $L_3$ value does not change and the receiver device may construct the current state vector value using the current $L_3$ value of 9. At this time, the receiver device has acquired the correct state vector value, namely, 9011, and the receiver device can begin to decrypt traffic received from the transmitter device.

Maintenance

The short component may be sufficient to maintain cryptographic synchronization without the aid of the long components. For example, the receiver device may switch to a maintenance mode once it obtains the current state vector value. While in the maintenance mode, the receiver device continues to update the short component and it may also continue to receive short components sent by the transmitter device. In addition, the receiver device increments the saved long component values as necessary to reflect rollover in the short component. The receiver device, however, need not process any received long components and, indeed, the receiver device may simply disregard any received long component.

In practical embodiments, however, after the state vector has been received in its entirety, it should be continually compared against the long component and short component messages sent from the transmitter device. Traffic bits can be lost or inserted during transmission, causing the receiver state vector to not match the transmitter state vector. If they do not match, the decrypted data will be useless. The long components of the state vectors will not deviate if the communication channel is significantly impaired, which tends to also decrease the probability that a series of long components are successfully transmitted to the receiver device. Additionally, the state vectors will not match if the state vector represents a discontinuous counter, i.e., those that increment linearly for a period of time, then switch to a new discontinuous value and resume incrementing from that new value. Thus, if the particular communication system employs discontinuous vector generation, then the receiver device may need to perform periodic state vector re-acquisition to ensure that it has the current state vector value.

It is still possible to use short components and long components in the same algorithmic manner to update the receiver state vector value if it loses synchronization with the transmitter device in the following manner:

(1) When any component (short or long) is received, it is compared against the respective bits in the current state vector value maintained at the receiver device.

(2) If the newly received bits are different, the receiver device performs a shortest distance comparison to determine whether it is more likely that the current state vector value maintained at the receiver device is ahead or behind the actual transmitter state vector. For example, if the difference indicates that the receiver state vector is either a few counts behind or a thousand counts ahead, then the receiver will assume that the receiver state vector is actually a few counts behind (which makes more practical sense).

(3) Next, the result of step (2) is analyzed to determine whether an update to the respective component in the receiver state vector would cause that receiver component to go past the zero point, resulting in either a roll-forward if the receiver state vector is behind or a roll-backward if the receiver state vector is ahead.

(4) If a roll-forward occurred, increment the receiver state vector bits above the updated component as a single large value. In other words, rollovers in components of lower bit significance will affect components of higher bit significance.

(5) If a roll-backward occurred, decrement the receiver state vector bits above the updated component as a single large value. In other words, rollbacks in components of higher bit significance will affect components of lower bit significance.

By processing a received component immediately, cryptographic synchronization can be regained quickly using the above methodology.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method for acquiring a state vector at a receiving device of a counter-based cryptographic data communication system, the receiving device comprising a state vector processing device, said method comprising:

receiving, in an unordered manner, a short component corresponding to the least significant bits of the state vector, and a number (N) of long components corresponding to more significant bits of the state vector, where N is a nonzero integer;

maintaining N counters with said state vector processing device, including a respective counter for each of said long components;

initializing the n-th one of said counters with said state vector processing device in response to receipt of the n-th one of said long components, where $1 \leq n \leq N$;

incrementing any initialized counter with said state vector processing device in response to received data traffic flow to maintain current counter values;

updating said short component with said state vector processing device in response to received data traffic flow to maintain a current short component value; and after receiving all of said long components, constructing a current state vector value with said state vector processing device, based upon said current short component value and said long components, and based upon said current counter values; wherein:

long component L1 is the least significant of said long components; and updating said long components comprises:

comparing said current short component value to the current counter value for said long component L1; and incrementing said long component L1 if the current counter value for said long component L1 is greater than said current short component value, while disregarding any resulting carry-over, resulting in an updated long component L1.

2. A method according to claim 1, further comprising updating said long components with said state vector processing device, based upon their respective times of receipt.

3. A method according to claim 2, wherein updating said long components comprises determining whether the current counter value for a specified long component indicates that said specified long component should be rolled over multiple times.

4. A method according to claim 3, further comprising calculating, with said state vector processing device, a rollover value corresponding to a number of rollovers in said specified long component, wherein constructing said current state vector value comprises updating said specified long component in response to said rollover value.

5. A method according to claim 4, wherein updating said specified long component comprises incrementing said specified long component by said rollover value while disregarding any resulting carry-over.

6. A method according to claim 1, wherein:

long component L2 is the least significant of said long components, other than said long component L1; and updating said long components comprises:

forming a partial state vector corresponding to said current short component value combined with said updated long component L1;

comparing said partial state vector to the current counter value for said long component L2; and incrementing said long component L2 if the current counter value for said long component L2 is greater than said partial state vector, while disregarding any resulting carry-over, resulting in an updated long component L2.

7. A method for acquiring a state vector, for a counter-based cryptographic data communication system having a receiver comprising a state vector processing device, from a received short component and a nonzero integer number (N) of received long components, the received short component and the received long components being received in an unordered manner, said method comprising:

maintaining N counters with said state vector processing device, including a respective counter for each of said received long components;

initializing, with said state vector processing device, the n-th one of said counters in response to receipt of the n-th one of said received long components, where $1 \leq n \leq N$;

incrementing any initialized counter with said state vector processing device in response to received data traffic flow to maintain current counter values;

obtaining, with said state vector processing device, a current short component value that is based upon the received short component;

generating, with said state vector processing device, N current long component values respectively corresponding to the N received long components, each of said N current long component values being based upon the age of its corresponding received long component; and constructing a current state vector value with said state vector processing device, based upon said current short component value, and said current long component values wherein constructing said current state vector value comprises updating the received long components based upon their respective times of receipt, and wherein constructing said current state vector value is based upon said current counter values; wherein:

long component L1 is the least significant of said received long components; and updating said received long components comprises:
comparing said current short component value to the current counter value for said long component L1; and
incrementing said long component L1 if the current counter value for said long component L1 is greater than said current short component value, while disregarding any resulting carry-over.

8. A method according to claim 7, wherein updating said received long components comprises determining whether the current counter value for a specified long component indicates that said specified long component should be rolled over multiple times.

9. A method according to claim 8, further comprising calculating, with said state vector processing device, a rollover value corresponding to a number of rollovers in said specified long component, wherein constructing said current state vector value comprises updating said specified long component in response to said rollover value.

10. A method according to claim 9, wherein updating said specified long component comprises incrementing said specified long component by said rollover value while disregarding any resulting carry-over.

11. A method according to claim 7, wherein obtaining said current short component value comprises updating the received short component in response to received data traffic flow.

12. A method according to claim 7, wherein:

long component L2 is the least significant of said received long components, other than said long component L1; and updating said received long components comprises:
forming a partial state vector corresponding to said current short component value combined with a current long component L1 value;
comparing said partial state vector to the current counter value for said long component L2; and
incrementing said long component L2 if said current counter value for said long component L2 is greater than said partial state vector, while disregarding any resulting carry-over.

13. In a receiver having a state vector processing device, a method for acquiring a state vector for a counter-based cryptographic data communication system, said method comprising:

receiving, with said state vector processing device and in an unordered manner, a short component corresponding to the least significant bits of the state vector, and a nonzero integer number (N) of long components corresponding to more significant bits of the state vector;

updating said short component with said state vector processing device in response to received data traffic flow to maintain a current short component value;

maintaining N counters with said state vector processing device, including a respective counter for each of said long components;

initializing the n-th one of said counters with said state vector processing device in response to receipt of the n-th one of said long components, where $1 \leq n \leq N$;

incrementing any initialized counter with said state vector processing device in response to received data traffic flow to maintain current counter values;

constructing a current state vector value with said state vector processing device in response to said current short component value, said long components, and said current counter values; and processing said current counter values with said state vector processing device to generate N current long component values respectively corresponding to said N long components; wherein:

long component L1 is the least significant of said long components; and processing said current counter values comprises:
comparing said current short component value to the current counter value for said long component L1; and
incrementing said long component L1 if the current counter value for said long component L1 is greater than said current short component value, while disregarding any resulting carry-over, resulting in an updated long component L1.

14. A method according to claim 13, wherein processing said current counter values comprises determining whether the current counter value for a specified long component indicates that said specified long component should be rolled over multiple times.

15. A method according to claim 14, wherein:

long component $L_n$ is one of said long components, where $1 \leq n \leq N$, $L_1$ is the least significant of said long components, and $L_N$ is the most significant of said long components;

$MAX\_L_n$ is a maximum value represented by said long component $L_n$; and said determining step comprises:
dividing the current counter value for said long component $L_n$ by the quantity $(MAX\_L_n+1)$ to obtain an $L_n$ integer quotient and an $L_n$ remainder, said $L_n$ integer quotient representing an $L_n$ multi-rollover value corresponding to a number of rollovers for the current long component value for long component $L_n$;
incrementing the current long component value for long component $L_n$ by said $L_n$ multi-rollover value, while disregarding any resulting carry-over; and
updating the current counter value for $L_n$ with said $L_n$ remainder.

16. A method according to claim 13, wherein:

long component L2 is the least significant of said long components, other than said long component L1; and processing said current counter values comprises:
   forming a partial state vector corresponding to said current short component value combined with said updated long component L1;
   comparing said partial state vector to the current counter value for said long component L2; and
   incrementing said long component L2 if the current counter value for said long component L2 is greater than said partial state vector, while disregarding any resulting carry-over, resulting in an updated long component L2.

* * * * *